Nov. 27, 1945.  C. R. HANNA ET AL  2,389,775

GYROSCOPE

Original Filed Sept. 27, 1941

WITNESSES:
E. H. Lutz
V. W. Novak

INVENTORS
CLINTON R. HANNA, STANLEY J. MIKINA
AND LAWRENCE B. LYNN.
BY
A. B. Ramiri
ATTORNEY Patented Nov. 27, 1945

2,389,775

UNITED STATES PATENT OFFICE 2,389,775

GYROSCOPE

Clinton R. Hanna, Pittsburgh, and Stanley J. Mikina and Lawrence B. Lynn, Wilkinsburg, Pa., assignors to Westinghouse Electric Corporation, East Pittsburgh, Pa., a corporation of Pennsylvania Original application September 27, 1941, Serial No. 412,612. Divided and this application November 6, 1944, Serial No. 562,210

3 Claims. (Cl. 74—5)

This application is a division of our application Serial No. 412,612, filed September 27, 1941, for an Electric turret traverse. In that application, there is disclosed and claimed a follow-up system which is controlled by means including a gyro. The present application relates to the improved gyro.

The present invention has for its object to provide a gyro to which angular motion is transmitted by means of a coupling constructed and arranged to provide for precessional movement of the gyro, and which precessional movement provides a controlling effect proportional to velocity of the applied motion, the coupling including torque-transmitting surfaces engageable under normal pressure due to gyroscopic action to develop frictional torques effective about the precession axis of the gyro for damping the latter.

This and other objects are effected by the invention as will be apparent from the following description and claims taken in connection with the accompanying drawing, forming a part of this application, in which:

Figure 1:
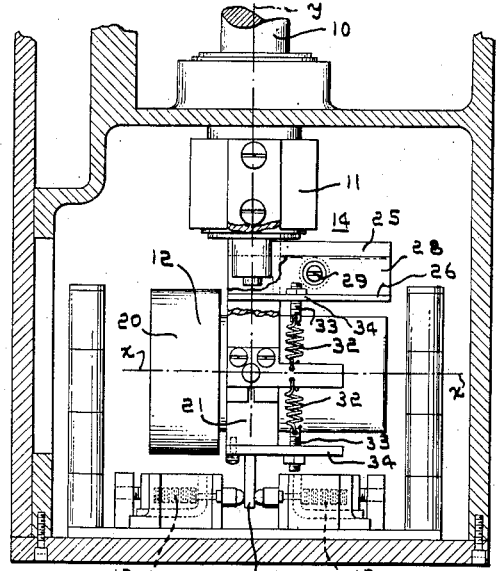
Fig. 1 is a fragmentary view showing the gyro in elevation.
Figure 2:
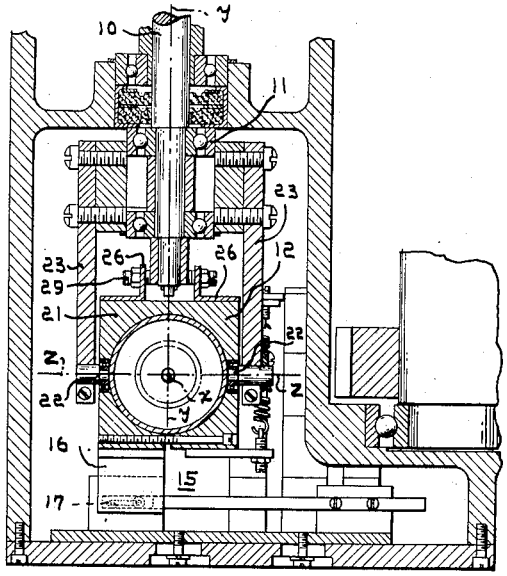
Fig. 2 is a sectional view of the apparatus shown in Fig. 1.
Figures 5, 6:
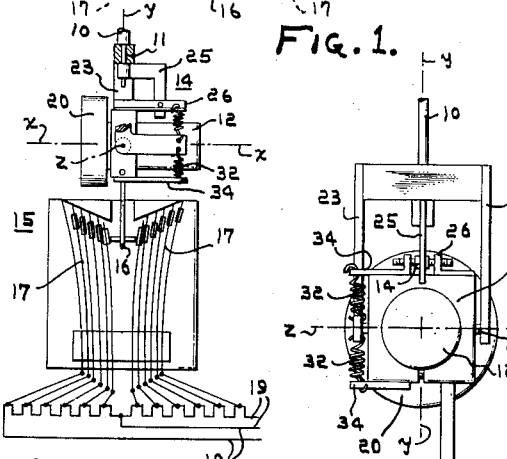
Fig. 5 is a view showing diagrammatically the gyro and the means controlled thereby.
Fig. 6 is an end view of the gyro.
Figure 3:
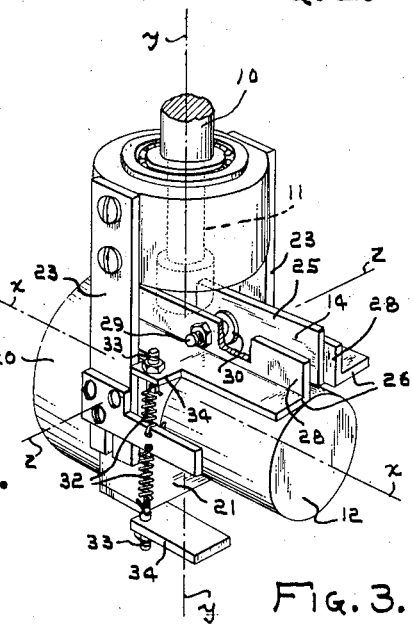
Fig. 3 is a perspective view of the gyro.

In the drawing, a member 10, for example, a shaft, has a swivel connection 11 with respect to a gyro 12, and the member or shaft and the gyro are connected by means of a torque-transmitting coupling, at 14, constructed and arranged to provide for precessional movement of the gyro and which precessional movement is proportional to angular velocity of the member 10. Precessional movement of the gyro is used to operate a suitable control device, at 15, including, for example, an actuator 16 and groups of contacts 17 which are progressively opened and closed to vary electric currents in a pair of electric circuits 18 and 19, whereby such currents are varied in proportion to angular velocity of the member 10.

The gyro, at 12, includes a rotor 20 journaled in a frame or casing 21 pivotally connected, at 22, 22 to the yoke 23, which is swiveled, at 11, to the member or shaft 10. The spin axis $x$—$x$ of the gyro extends transversely of the swivel axis $y$—$y$ and the precession axis $z$—$z$, defined by the axis of the pivots 22, 22, is normal both to the spin and swivel axes.

Figure 4:
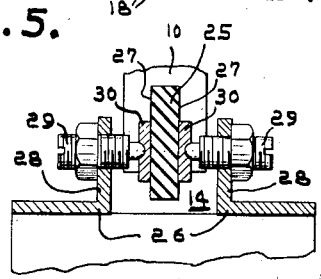
Fig. 4 is a sectional detail of the damper.

The coupling, at 14, comprises members 25 and 26 attached to the shaft 10 and to the gyro frame 21, respectively. As shown in Fig. 4, one of the members of the coupling, for example, the member 25, is in the form of a plate whose side surfaces 27, 27 are arranged in planes extending normally to the precession axis $z$—$z$ and the other member of the coupling, for example the member 26, comprises supporting angles 28 carrying adjusting screws 29 supporting at their inner ends shoes or pads 30 engageable frictionally with the surfaces 27.

With this arrangement of friction surfaces and shoes, and, as the yoke 23 is swivelled to the member 10, the shoes and surfaces will engage under normal pressure due to gyroscopic action to develop friction torques effective to damp the gyro about the precession axis. As the normal pressure with which the shoes and surfaces engage depends upon precessional velocity, it will be apparent that the most effective damping torques will be developed, that is, the damping torque is proportional to the precessional velocity with the result that a condition of constant damping is secured.

Centering springs 32 have their outer ends connected to the gyro frame 21 and have their inner ends connected to the yoke 23, such springs being arranged to center the gyro about the precession axis $z$—$z$. The springs are preferably adjustable by means of screws 33 cooperating with plate elements 34 carried by the gyro inner frame 21. In addition to the centering effect of the springs, such springs and the frictional surfaces work together to provide a filter which is effective to prevent the transmission of undesired vibratory effects or disturbances to the gyro.

As shown, the gyro casing or frame 21 has the actuator 16 attached thereto and arranged so that precessional movement of the gyro causes it to engage groups of contacts 17, 17 at either side of the actuator so as to control electric currents in a pair of electric circuits 18 and 19.

While the invention has been shown in but one form, it will be obvious to those skilled in the art that it is not so limited, but is susceptible of various changes and modifications without departing from the spirit thereof.

What is claimed is:

1. In combination, a body member movable about a predetermined axis, a gyro, swivel means connecting the gyro to the body member and having its axis parallel to or coincident with said member axis, said gyro having its spin axis extending transversely of the swivel axis and having an axis of precession normal both to the spin axis and to the swivel axis, a coupling between the body member and the gyro and including friction surfaces arranged to transmit torque from the body member to the gyro about the swivel axis and to provide for precessional movement of the gyro about the precession axis, and centering springs acting on the gyro about the precession axis, said friction surfaces being engageable under normal pressure due to gyroscopic action to provide damping friction torques effective about the precession axis.

2. Apparatus according to claim 1 with means providing for adjustment of the centering springs.

3. In combination, a body member movable about a predetermined axis; a gyro including a casing, a rotor pivotally mounted in the casing, a yoke pivotally connected to the casing about a precession axis normal to the rotor spin axis; swivel means connecting the yoke to the body member and having its axis normal to the precession axis and extending transversely of the spin axis; said axis of the swivel means being parallel to or coincident with the body member axis; a coupling between the body member and said casing and including friction surfaces arranged to transmit torque from the body member to the casing about the swivel axis and to provide for precessional movement of the casing and the rotor carried thereby about the precession axis; springs having their inner ends attached to the casing and having their outer ends attached to the yoke; said springs being arranged to exert a centering effect on the casing and the rotor carried thereby about the precession axis; said friction surfaces being engageable under normal pressure due to gyroscopic action to provide damping friction torques effective about the precession axis.

CLINTON R. HANNA.
STANLEY J. MIKINA.
LAWRENCE B. LYNN.